(12) United States Patent
Bette et al.

(10) Patent No.: US 7,348,085 B2
(45) Date of Patent: Mar. 25, 2008

(54) FUEL CELL INSTALLATION

(75) Inventors: Willi Bette, Erlangen (DE); Josef Lersch, Heroldsbach (DE); Arno Mattejat, Bubenreuth (DE); Karl Strasser, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 423 days.

(21) Appl. No.: 10/381,707

(22) PCT Filed: Sep. 14, 2001

(86) PCT No.: PCT/DE01/03530

§ 371 (c)(1),
(2), (4) Date: Mar. 27, 2003

(87) PCT Pub. No.: WO02/27833

PCT Pub. Date: Apr. 4, 2002

(65) Prior Publication Data

US 2004/0096714 A1 May 20, 2004

(30) Foreign Application Priority Data

Sep. 27, 2000 (DE) ................. 100 47 913

(51) Int. Cl.
*H01M 8/04* (2006.01)
*H01M 8/12* (2006.01)
*H01M 2/00* (2006.01)

(52) U.S. Cl. ............... 429/23; 429/25; 429/10
(58) Field of Classification Search ............... None
See application file for complete search history.

(56) References Cited

U.S. PATENT DOCUMENTS

| 3,981,745 | A | * | 9/1976 | Stedman ............... 204/266 |
| 4,407,903 | A | | 10/1983 | Gutbier et al. |
| 4,520,082 | A | | 5/1985 | Makiel |
| 4,839,247 | A | * | 6/1989 | Levy et al. ............... 429/21 |

(Continued)

FOREIGN PATENT DOCUMENTS

DE 3333378 4/1984

(Continued)

OTHER PUBLICATIONS

Shigeki; "Fuel Cell"; Patent Abstracts of JAPAN; JP 01276566; PD Nov. 7, 1989.

(Continued)

*Primary Examiner*—Patrick Joseph Ryan
*Assistant Examiner*—Julian Mercado
(74) *Attorney, Agent, or Firm*—Harness, Dickey & Pierce, P.L.C.

(57) ABSTRACT

A leak in a fuel cell module can allow hydrogen and/or oxygen to escape from the fuel cell module, thereby creating a high risk of fire or explosion. This problem is addressed by providing a fuel cell installation with a fuel cell module that is enclosed in a gas-tight pressure container. Filling the pressure container with a protective gas ensures that if the fuel cell module does leak, no operating gas can escape from the module, with protective gas entering the module instead. A leak therefore no longer poses a risk. The leak can also be identified and located by a voltage drop in the cells affected by the leak.

23 Claims, 1 Drawing Sheet

U.S. PATENT DOCUMENTS

| | | | |
|---|---|---|---|
| 5,192,627 A * | 3/1993 | Perry et al. | 429/17 |
| 5,235,846 A * | 8/1993 | Fanciullo | 73/40.7 |
| 5,340,663 A * | 8/1994 | Buswell et al. | 429/17 |
| 6,063,515 A * | 5/2000 | Epp et al. | 429/17 |
| 6,156,447 A * | 12/2000 | Bette et al. | 429/13 |
| 6,406,806 B1 * | 6/2002 | Keskula et al. | 429/13 |
| 6,432,569 B1 | 8/2002 | Zeilinger et al. | |

FOREIGN PATENT DOCUMENTS

| | | |
|---|---|---|
| DE | 43 39 405 C1 | 1/1995 |
| DE | 4339405 | 1/1995 |
| EP | 0055011 | 6/1982 |
| EP | 0 918 363 B1 | 5/1999 |
| EP | 0 918 363 B1 | 3/2001 |
| JP | 57111963 | 10/1983 |
| JP | 59-098471 * | 6/1984 |
| JP | 62061278 | 3/1987 |
| JP | 2312162 | 12/1990 |
| JP | 11273702 | 8/2002 |
| WO | WO 99/62129 | 12/1999 |
| WO | 0026983 | 5/2000 |

OTHER PUBLICATIONS

Translation of International Preliminary Examination Report dated Sep. 5, 2006 for corresponding PCT Application No. PCT/DE 01/03530.

* cited by examiner

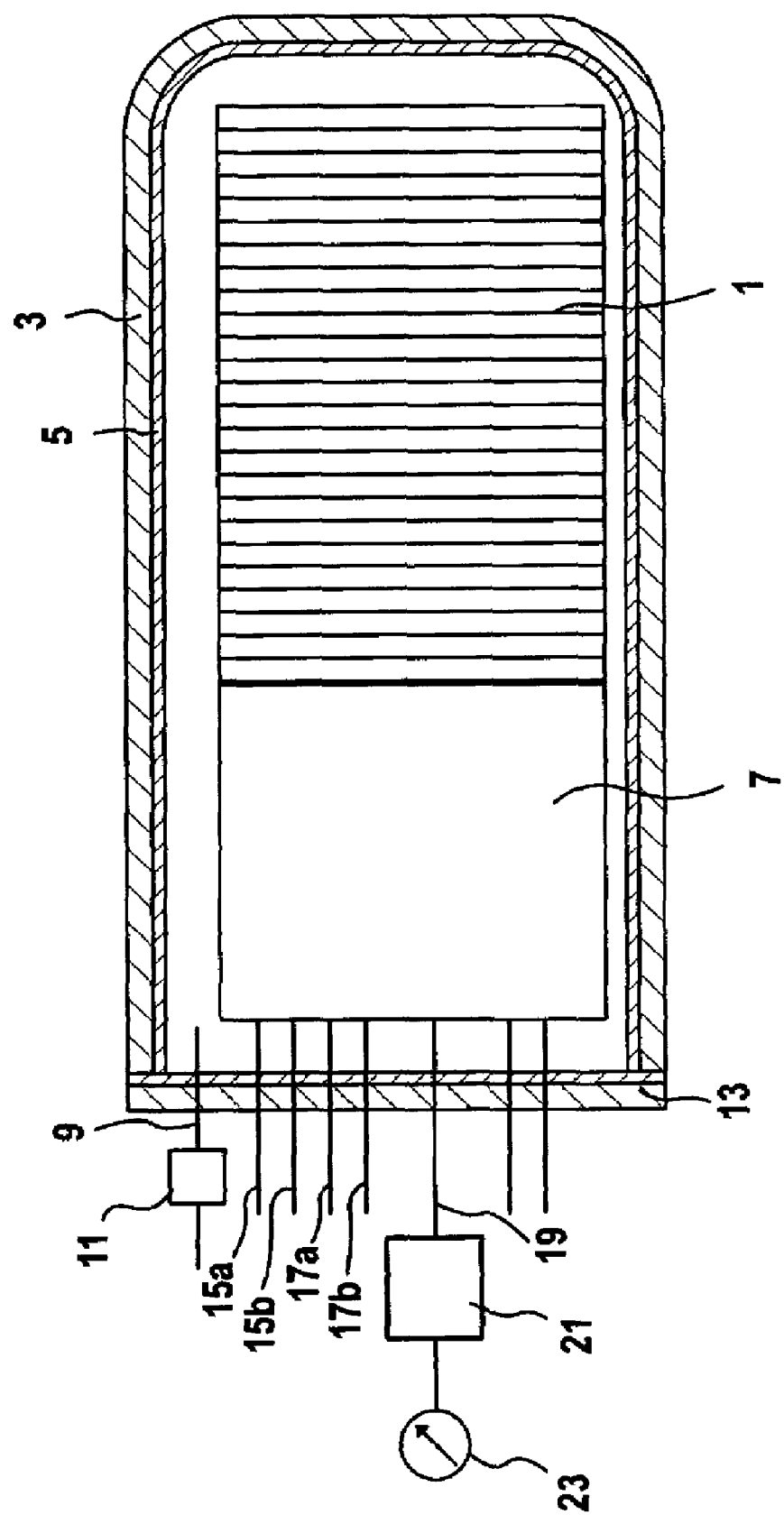

FUEL CELL INSTALLATION

This application is the national phase under 35 U.S.C. § 371 of PCT International Application No. PCT/DE01/03530 which has an International filing date of Sep. 14, 2001, which designated the United States of America and which claims priority on European Patent Application number DE 100 47 913.8 filed Sep. 27, 2000, the entire contents of which are hereby incorporated herein by reference.

FIELD OF THE INVENTION

The invention generally relates to a fuel cell system.

BACKGROUND OF THE INVENTION

A fuel cell system includes one or more fuel cell modules, which in turn include a number of fuel cells connected in series. The fuel cells may be designed in tubular form or as plates, a fuel cell module including fuel cells in plate form also being referred to as a fuel cell block.

In a fuel cell, electrical energy and heat are generated by bringing together hydrogen ($H_2$) and oxygen ($O_2$) in an electrochemical reaction, the hydrogen ($H_2$) and oxygen ($O_2$) combining to form water ($H_2O$). For this purpose, hydrogen is introduced into the anode gas space of the fuel cell and oxygen is introduced into the cathode gas space of the fuel cell. The hydrogen can be fed into the fuel cell either as pure hydrogen or as a hydrogen-containing fuel gas. The oxygen can be fed to the fuel cell as pure oxygen or, for example, in the form of air.

When designing a fuel cell module, it should be ensured that the anode gas spaces and the cathode gas spaces of the module are connected to one another in such a manner that neither of the two operating gases can escape from the fuel cell module. Therefore, in the past highly evolved joining and connecting techniques have been developed, the intention being to ensure that neither of the operating gases escapes from a fuel cell module, this being undesirable.

During operation, the individual cells of a fuel cell module are subject to considerable temperature fluctuations. Moreover, the operating gases are passed into the module at a superatmospheric pressure. This superatmospheric pressure may amount to up to a few bar.

On account of the pressure and temperature fluctuations, the connections between individual fuel cells and the connections between the individual components of a fuel cell, such as for example an interconnecting conductor plate and a membrane-electrolyte assembly, are subject to particularly high demands. Therefore, leaks constantly occur in a fuel cell block, with the result that hydrogen or oxygen escapes from the fuel cell block into the environment. Since an escape of hydrogen entails a risk of explosion and even an escape of oxygen entails an increased risk of fire, it is imperative to prevent operating gases from escaping from a fuel cell module into the environment.

SUMMARY OF THE INVENTION

Therefore, an object of an embodiment of the present invention is to provide a fuel cell system with an increased avoidance of operating gases escaping into the environment.

This object may be achieved by a fuel cell system which, according to an embodiment of the invention, includes a fuel cell module which is enclosed in a gastight pressure vessel. If leaks occur in the fuel cell module, so that an operating gas can escape from the module, the dispersion of this gas into the environment is effectively prevented by the pressure vessel. The escaped operating gas collects in the pressure vessel, with the result that the pressure rises in the gastight pressure vessel. This pressure increase can easily be detected, and the fuel cell system or at least the fuel cell module can be shut down in the event of the gas pressure in the vessel rising. For this purpose, the pressure vessel should advantageously be designed for a pressure which is at least 1.5 times as great as the operating pressure of the fuel cell module. This reliably prevents operating gas escaping from the fuel cell module from passing into the environment of the fuel cell system, where it can wreak havoc.

In an advantageous configuration of an embodiment of the invention, gas feedlines are connected to the pressure vessel, and the pressure vessel is intended to be under superatmospheric pressure when the fuel cell module is operating. To achieve a very high level of operating safety of the fuel cell system, the pressure vessel, while the fuel cell module is operating, is filled with an inert gas or shielding gas, such as for example nitrogen. In the pressure vessel, this shielding gas is under a pressure which is higher than the operating pressure of the fuel cell module. In the event of a leakage in the fuel cell module, therefore, it is impossible for any operating gas to escape from the module. Rather, the shielding gas flows into the fuel cell module. This ensures that, even in the event of a simultaneous leak on the anode side and the cathode side of the fuel cell module, it is impossible for an explosive mixture to enter the pressure vessel. Therefore, the operating gas which escapes from the module cannot cause any damage.

The fuel cell module expediently includes a fuel cell block which is designed for operation with pure oxygen ($O_2$) and pure hydrogen ($H_2$). What is known as a dead end block of this type, while it is operating, produces scarcely any exhaust gases, since hydrogen and oxygen are completely converted into water ($H_2O$). Operation with pure hydrogen and oxygen means that there is a particular risk of damage if the operating gases escape from the module. Therefore, shielding by means of the pressure vessel is particularly advantageous.

The fuel cell system advantageously includes an electronic cell-voltage-monitoring device. This cell-voltage-monitoring device may, for example, be designed to monitor the voltage of the fuel cell module, i.e. the cumulative voltage of all the fuel cells. However, the monitoring device may also be designed in such a way that the voltages of individual fuel cell module parts, such as for example the cascade stages of a fuel cell block, are monitored separately. Of course, the most accurate monitoring can be achieved if the cell-voltage-monitoring device monitors each cell of the fuel cell module individually or at least each subgroup of fuel cells, including a plurality of fuel cells, individually. In the event of a leak in the fuel cell module, shielding gas penetrates into at least one fuel cell. This shielding gas displaces the operating gas in the fuel cell. As a result, the cell voltage generated by the fuel cell drops.

The drop in the cell voltage is monitored by the electronic cell-voltage-monitoring device. In the event of the cell voltage dropping below a predetermined voltage value, the cell-voltage-monitoring device emits a fault signal. This fault signal, by way of example, causes the fuel cell module to be shut down, and its operating gas feedlines to be closed, so that the fuel cell module is then brought into a safe state. In a further possibility, the fault signal is transmitted to a display device at a monitoring station, for example to a screen of a control panel or to a navigating stand. In combination with the fault signal, it is also possible for an analysis of the fault to be transmitted to the monitoring position. This analysis comprises, for example, an indication of the size of the leak. The size of the leak is dependent on the drop in the cell voltage of a fuel cell. Therefore, a person at a monitoring position or a control unit can decide to allow the module to continue to operate under certain circumstances. This is possible because even in the event of a leak in a fuel cell module there is no possibility of operating gas escaping from the module and therefore there is no danger to the environment surrounding the fuel cell system.

The analysis of the fault which is passed to the monitoring station may in particular include the location of the leak. Depending on the accuracy with which the cell-voltage-monitoring device monitors the individual cells, the leak can immediately be located unambiguously. Depending on the electrical connection of the fuel cell module and depending on the way in which the module is equipped with feedlines and valves, it is also possible for only part of the fuel cell module, for example just one cascade stage, to be disconnected while the remainder of the module continues to operate.

In addition, further details relating to the safety risk associated with the leak or the ability of the fuel cell module to continue to operate can be given to the monitoring station.

The pressure vessel expediently also surrounds the supply module of the fuel cell module. A fuel cell module includes a number of tubular or planar fuel cells with associated supply and discharge lines. These lines can be combined with other supply devices, such as water separators, pumps, compressors, humidifiers, valves, power lines, sensors or cables, in a supply module. This supply module is generally fitted directly to the fuel cell module. In the case of a pressure vessel which also surrounds the supply module, leaks which occur in the supply module, for example at cylinders, tubes or compressors, are also rendered harmless. It is impossible for any operating gas to escape into the environment surrounding the fuel cell system. A further advantage of this configuration of an embodiment of the invention resides in the fact that there is a large number of lines and connections between the supply module and the fuel cell module. If the pressure vessel surrounds both modules, the number of lead-throughs passing through the pressure vessel is reduced considerably. Thus, the pressure vessel can be of safer and of more simple design.

The fuel cell system is advantageously designed as a power supply device for an electrical unit of a submarine. Particular safety and operating requirements have to be complied with in a submarine. A pressure vessel around the fuel cell module reliably ensures that it is impossible for any operating gas to escape from the fuel cell system, which is a requirement which is particularly imperative in a submarine. Since ventilation is scarcely possible in a submarine, the risk of explosion and fires is particularly great here. Since an explosion or a fire is particularly devastating in a submarine, there are also extremely strict safety regulations which are satisfied by a pressure vessel.

An embodiment of the invention makes it possible to comply with the safety provisions relating to the risk of fire and explosions. Moreover, the advantage that a fuel cell module can under certain circumstances continue to be operated despite a leak is particularly beneficial in a submarine: in a submarine, conditions may occur under which the power supply has to be maintained under all circumstances even in the event of the most extreme conditions. Even if the fuel cell module is exposed to extreme mechanical loads, for example in the event of considerable acceleration or also in the event of an impact, and as a result cracks in the fuel cell module cause leaks, the fuel cell module can under certain circumstances continue to operate. Without causing any risk, the module can continue to operate until so much shielding gas has entered the module that the module fails to generate power.

A further advantage is achieved through the fact that the pressure vessel includes metal with a high magnetic susceptibility. A fuel cell module generates a high electric current. Depending on the number of cells in the fuel cell module, this current may amount to a few hundred amperes. A current of this level generates a considerable magnetic field. A submarine is tracked, inter alia, by its magnetic field or the surrounding magnetic field being changed by the submarine.

Therefore, a fuel cell system which is installed in a submarine has to be magnetically shielded. This shielding is reliably achieved by the current-carrying modules of the fuel cell system being surrounded by a vessel which includes a metal with a high magnetic susceptibility. The vessel may, for example, be made from a metal of this type or may comprise a layer of a metal with a high magnetic susceptibility, for example what is known as i-metal. A vessel of this type results, in a simple and extremely fault-free manner, in triple shielding of the fuel cell module: the pressure vessel shields the magnetic field, and also the electric field radiated by the fuel cell module is shielded and, in addition, the environment surrounding the fuel cell system is shielded against operating gases which escape from the fuel cell module. This simple measure ensures that many of the operating and safety requirements imposed on a fuel cell system in a submarine are satisfied.

BRIEF DESCRIPTION OF THE DRAWINGS

An exemplary embodiment of the invention is explained with reference to a FIGURE, wherein FIG. 1 shows a fuel cell module 1 of a fuel cell system which is enclosed in a gastight pressure vessel 3.

DETAILED DESCRIPTION OF THE PREFERRED EMBODIMENTS

FIG. 1 shows a fuel cell module 1 of a fuel cell system which is enclosed in a gastight pressure vessel 3. The pressure vessel 3 comprises a steel outer skin, which is lined on the inner side with a layer of a metal 5 with a high magnetic susceptibility. A supply module 7, in which various devices for supplying and removing operating gas, removing product water, tapping the electrical energy and for monitoring are arranged, is connected to the fuel cell module 1. A gas feedline 9, through which a gas can be introduced into the pressure vessel 3 from the outside, is connected to the pressure vessel 3. A pressure sensor 11 for monitoring the internal pressure of the pressure vessel 3 is attached to this gas feedline 9.

Lead-throughs for the feedlines 15a and 15b for fuel gas and oxidation gas leading to the supply module and lines 17a and 17b for tapping the electrical energy from the fuel cell module are introduced at the front plate 13 of the pressure vessel 3. A signal cable 19 leads from the fuel cells of the fuel cell module 1 through a further lead-through to an electronic cell-voltage-monitoring device 21. The pressure vessel 3 with the fuel cell module 1 and the supply module 7 are part of a fuel cell system which is designed as a power supply device for an electrical unit of a submarine.

While the fuel cell system is operating, the pressure vessel 3 is filled with nitrogen ($N_2$) through the line 9. The internal pressure in the pressure vessel 3 is 20% higher than the maximum operating pressure in the fuel cells of the fuel cell module 1. If, while the fuel cell system is operating, a leak occurs in the external seal of the fuel cell module 1, no operating gas escapes from the fuel cell module 1, but rather shielding gas from the interior of the pressure vessel 3 penetrates into at least one fuel cell of the fuel cell module 1. This shielding gas displaces operating gas in the fuel cell, with the result that the cell voltage of this cell drops.

The drop in the cell voltage is monitored by the electronic cell-voltage-monitoring device 21. In the normal operating mode of the fuel cell system, the electronic cell-voltage-monitoring device 21 compares the electric voltage of the cells or a number of cells with a limit value. If the voltage drops below this limit value, the feed of operating gas to the module 1 is switched off and the module 1 is brought to a safe state. In another operating mode of the fuel cell system, if the voltage drops below the limit value, a signal is transmitted to a display device 23. However, operation of the fuel cell module 1 is continued. In addition, the temporal profile of the voltage of the fuel cell module 1 and of the affected cells is presented on the display device 23. Furthermore, the location of the leak is indicated. Therefore, the operating staff or a control unit of the fuel cell system can decide whether the extent of the leak is sufficiently critical to warrant shutting down the fuel cell module 1, and, if necessary, subsequently shut down the fuel cell module 1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A fuel cell system, comprising:
   a fuel cell module enclosed in a gastight pressure vessel, wherein the fuel cell module includes a plurality of fuel cells connected in series, a gas feedline is connected to the gastight pressure vessel, an environment between the gastight pressure vessel and the fuel cell module is filled with an inert gas or a shielding gas during operation under a pressure which is higher than an operating pressure of the fuel cell module and the gastight pressure vessel operates under superatmospheric pressure; and
   an electronic cell-voltage monitoring device for detecting a leak in the fuel cell module by monitoring a drop in the cell voltage.

2. The fuel cell system as claimed in claim 1, wherein the pressure vessel also surrounds a supply module of the fuel cell module.

3. The fuel cell system as claimed in claim 1, wherein the fuel cell system is designed as a power supply device for an electrical unit of a submarine.

4. The fuel cell system as claimed in claim 3, wherein the pressure vessel includes metal sufficient to shield a magnetic field and an electric field radiated by the fuel cell module.

5. A power supply device for an electrical unit of a submarine comprising the fuel cell system as claimed in claim 1.

6. The fuel cell system as claimed in claim 1, wherein escaped operating gas of the fuel cell module collects in the pressure vessel.

7. The fuel cell system as claimed in claim 1, further comprising a control device which detects a pressure change in the pressure vessel.

8. The fuel cell system as claimed in claim 7, further comprising:
   a control device for shutting down the fuel cell module.

9. The fuel cell system as claimed in claim 8, wherein the pressure vessel is designed for a pressure which is at least 1.5 times as great as an operating pressure of the fuel cell module.

10. The fuel cell system as claimed in claim 1, wherein the pressure vessel has a pressure which is at least 1.5 times greater than an operating pressure of the fuel cell module.

11. The fuel cell system as claimed in claim 1, wherein the inert or shielding gas is nitrogen.

12. The fuel cell system of claim 1, wherein the fuel cell module includes a plurality of at least one of tubular and planar fuel cells.

13. The fuel cell system of claim 1, wherein the fuel cell module includes a plurality of at least one of tubular and planar fuel cells, each with associated supply and discharge lines.

14. The fuel cell system as claimed in claim 1, wherein the electronic cell-voltage monitoring device emits a fault signal when the drop in the cell voltage is detected.

15. A power supply device for an electrical unit of a submarine, comprising:
   at least one fuel cell module enclosed in a gastight pressure vessel, wherein the at least one fuel cell module includes a plurality of fuel cells connected in series, an environment between the gastight pressure vessel and the at least one fuel cell module is filled with an inert gas or a shielding gas during operation under a pressure which is higher than an operating pressure of the fuel cell module and the gastight pressure vessel operates under superatmospheric pressure; and
   an electronic cell-voltage monitoring device for detecting a leak in the at least one fuel cell module by monitoring a drop in the cell voltage.

16. The power supply device of claim 15, further comprising:
   a device adapted to shut down the fuel cell module.

17. The power supply device of claim 16, wherein the pressure vessel is designed for a pressure which is at least 1.5 times as great as an operating pressure of the fuel cell module.

18. The power supply device of claim 15, wherein the pressure vessel is designed for a pressure which is at least 1.5 times as great as an operating pressure of the fuel cell module.

19. The power supply device of claim 15, wherein the pressure vessel is made from a metal sufficient to shield a magnetic field and an electric field radiated by the fuel cell module.

20. The power supply device of claim 19, wherein the metal is a i-metal.

21. The power supply device of claim 15, wherein the pressure vessel includes a layer of a metal sufficient to shield a magnetic field and an electric field radiated by the fuel cell module.

22. The power supply device of claim 21, wherein the metal is a μ-metal.

23. The power supply device of claim 15, wherein the electronic cell-voltage monitoring device emits a fault signal when the drop in the cell voltage is detected.

\* \* \* \* \*